(12) United States Patent
Hannwacker et al.

(10) Patent No.: US 10,317,085 B2
(45) Date of Patent: Jun. 11, 2019

(54) COMBUSTOR ASSEMBLY

(71) Applicant: General Electric Company, Schenectady, NY (US)

(72) Inventors: David Andrew Hannwacker, Torrance, CA (US); Stephen John Howell, West Newbury, MA (US); John Carl Jacobson, Melrose, MA (US)

(73) Assignee: General Electric Company, Schenectady, NY (US)

(*) Notice: Subject to any disclaimer, the term of this patent is extended or adjusted under 35 U.S.C. 154(b) by 538 days.

(21) Appl. No.: 15/053,522

(22) Filed: Feb. 25, 2016

(65) Prior Publication Data
US 2017/0248320 A1  Aug. 31, 2017

(51) Int. Cl.
| | | |
|---|---|---|
| F02C 7/20 | (2006.01) |
| F23R 3/60 | (2006.01) |
| F23R 3/14 | (2006.01) |
| F23R 3/28 | (2006.01) |

(52) U.S. Cl.
CPC .................. *F23R 3/60* (2013.01); *F02C 7/20* (2013.01); *F23R 3/14* (2013.01); *F23R 3/283* (2013.01); *Y02T 50/675* (2013.01)

(58) Field of Classification Search
CPC .. F23R 3/283; F23R 3/007; F23R 3/50; F23R 3/60; F23R 3/002; F23R 2900/03043;
(Continued)

(56) References Cited

U.S. PATENT DOCUMENTS 4,085,581 A * 4/1978 Caruel .................... F23R 3/002
  60/738
5,117,637 A * 6/1992 Howell ................... F23R 3/283
  60/740

(Continued)

FOREIGN PATENT DOCUMENTS

EP  1 253 380 A2  10/2002
EP  2 690 364 A2  1/2014

(Continued)

OTHER PUBLICATIONS

Extended European Search Report and Opinion issued in connection with corresponding EP Application No. 16206136.0 dated Jul. 24, 2017.

*Primary Examiner* — Andrew H Nguyen
(74) *Attorney, Agent, or Firm* — Dority & Manning, P.A.

(57) ABSTRACT

A combustor assembly for a gas turbine engine includes a combustor dome having a hot side and a cold side and at least in part defining a combustion chamber. The combustor assembly additionally includes a fuel-air injector hardware assembly having a first member and a second member. The first member is positioned at least partially adjacent to the cold side of the combustor dome and the second member is positioned at least partially adjacent to the hot side of the combustor dome. The first and second members together define an attachment interface joining the first member to the second member and mounting the fuel-air injector hardware assembly to the combustor dome. The attachment interface may be shielded from the combustion chamber to protect the (Continued)

attachment interface from an undesirable amount of thermal expansion and to maintain the materials within desired material operating temperature limits.

19 Claims, 8 Drawing Sheets

(58) Field of Classification Search
CPC .. F23R 2900/00017; F23R 2900/00005; F02C 7/20; F05D 2240/91; F05D 2260/31
See application file for complete search history.

(56) References Cited

U.S. PATENT DOCUMENTS

| | | | | |
|---|---|---|---|---|
| 5,996,335 A | * | 12/1999 | Ebel | F23R 3/50 60/740 |
| 6,212,870 B1 | * | 4/2001 | Thompson | F23R 3/14 60/746 |
| 6,314,739 B1 | * | 11/2001 | Howell | F01D 11/005 60/748 |
| 6,442,940 B1 | | 9/2002 | Young et al. | |
| 8,141,371 B1 | | 3/2012 | Habarou et al. | |
| 8,146,372 B2 | * | 4/2012 | Carrere | F23R 3/002 60/753 |
| 2003/0061815 A1 | * | 4/2003 | Young | B23P 6/00 60/748 |
| 2006/0064983 A1 | | 3/2006 | Currin et al. | |
| 2008/0066468 A1 | * | 3/2008 | Faulder | F23R 3/002 60/737 |

FOREIGN PATENT DOCUMENTS

| | | |
|---|---|---|
| FR | 2 935 465 A1 | 3/2010 |
| WO | 2016/051067 A1 | 4/2016 |

* cited by examiner

COMBUSTOR ASSEMBLY

FEDERALLY SPONSORED RESEARCH

This invention was made with government support under contract number W911W6-11-2-0009 of the U.S. Army. The government may have certain rights in the invention.

FIELD OF THE INVENTION

The present subject matter relates generally to a gas turbine engine, or more particularly to a combustor assembly for a gas turbine engine.

BACKGROUND OF THE INVENTION

A gas turbine engine generally includes a fan and a core arranged in flow communication with one another. Additionally, the core of the gas turbine engine general includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

More commonly, non-traditional high temperature materials, such as ceramic matrix composite (CMC) materials, are being used as structural components within gas turbine engines. For example, typical combustion sections include an inner liner, an outer liner, and a dome. More commonly, the inner and outer liners are being formed of CMC materials, while the dome is formed of a metal material. The metal dome has conventionally been required to attach certain fuel-air injection assemblies.

The inventors of the present disclosure have found that it may be beneficial to additionally form the dome of a CMC material such that the dome may be better suited to withstand the relatively high operating temperatures of the combustion section. However, attachment of the fuel-air injection assemblies to the dome can be problematic with such a configuration, as the fuel-air injection assemblies may be formed of a metal material. Accordingly, an improved attachment assembly for a fuel-air injector assembly for a gas turbine engine would be useful. More particularly, an improved attachment assembly for a fuel-air injector assembly to a CMC combustor dome would be particularly beneficial.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure a combustor assembly for a gas turbine engine is provided. The combustor assembly includes a combustor dome at least partially defining a combustion chamber and including a hot side and a cold side. The combustor assembly additionally includes a fuel-air injector hardware assembly. The fuel-air injector hardware assembly includes a first member positioned at least partially adjacent to the cold side of the combustor dome, and a second member positioned at least partially adjacent to the hot side of the combustor dome. The first and second members together define an attachment interface joining the first member to the second member and mounting the fuel-air injector hardware assembly to the combustor dome. The attachment interface is shielded from the combustion chamber.

In another exemplary embodiment of the present disclosure a combustor assembly for a gas turbine engine is provided. The combustor assembly includes a combustor dome at least partially defining a combustion chamber and including a hot side and a cold side. The combustor assembly additionally includes a fuel-air injector hardware assembly for providing a fuel-air mixture to the combustion chamber. The fuel-air injector hardware assembly includes a first member positioned at least partially adjacent to the cold side of the combustor dome, and a heat shield for shielding at least a portion of the fuel-air injector hardware assembly and positioned at least partially adjacent to the hot side of the combustor dome. The heat shield is joined to the first member to mount the fuel-air injector hardware assembly to the combustor dome.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
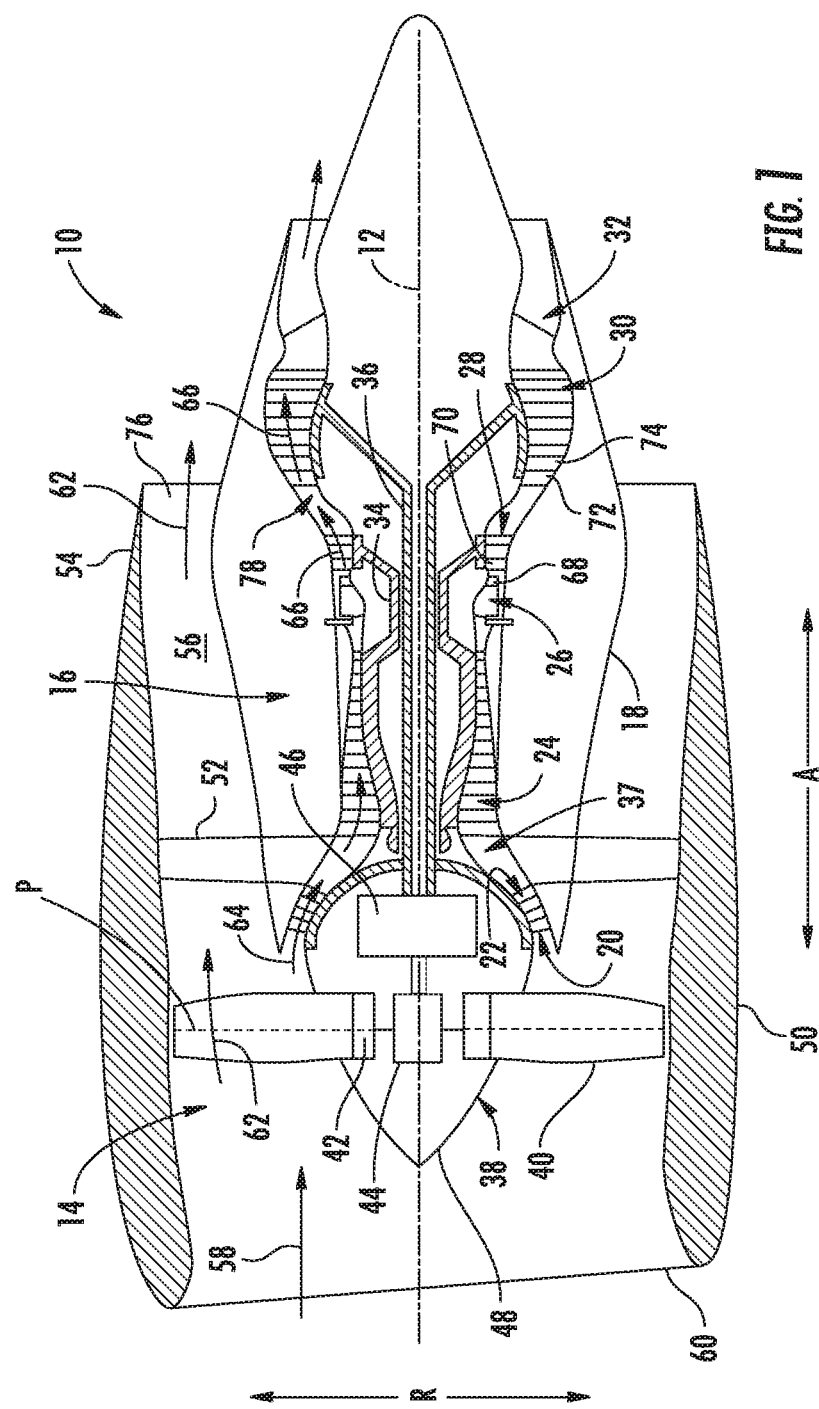
FIG. 1 is a schematic cross-sectional view of an exemplary gas turbine engine according to various embodiments of the present subject matter.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference), a radial direction R, and a circumferential direction (not shown) extending about the axial direction A. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases and the core turbine engine 16 includes, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. The compressor section, combustion section 26, turbine section, and nozzle section 32 together define a core air flowpath 37.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable pitch change mechanism 44 configured to collectively vary the pitch of the fan blades 40 in unison. The fan blades 40, disk 42, and pitch change mechanism 44 are together rotatable about the longitudinal axis 12 by LP shaft 36 across a power gear box 46. The power gear box 46 includes a plurality of gears for adjusting the rotational speed of the fan 38 relative to the LP shaft 36 to a more efficient rotational fan speed.

Referring still to the exemplary embodiment of FIG. 1, the disk 42 is covered by a rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. The exemplary nacelle 50 is supported relative to the core turbine engine 16 by a plurality of circumferentially-spaced outlet guide vanes 52. Moreover, a downstream section 54 of the nacelle 50 extends over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the core air flowpath 37, or more specifically into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated, however, that the exemplary turbofan engine 10 depicted in FIG. 1 is provided by way of example only, and that in other exemplary embodiments, the turbofan engine 10 may have any other suitable configuration. It should also be appreciated, that in still other exemplary embodiments, aspects of the present disclosure may be incorporated into any other suitable gas turbine engine. For example, in other exemplary embodiments, aspects of the present disclosure may be incorporated into, e.g., a turboprop engine, a turboshaft engine, a turbojet engine, or a power generation gas turbine engine.

Figure 2:
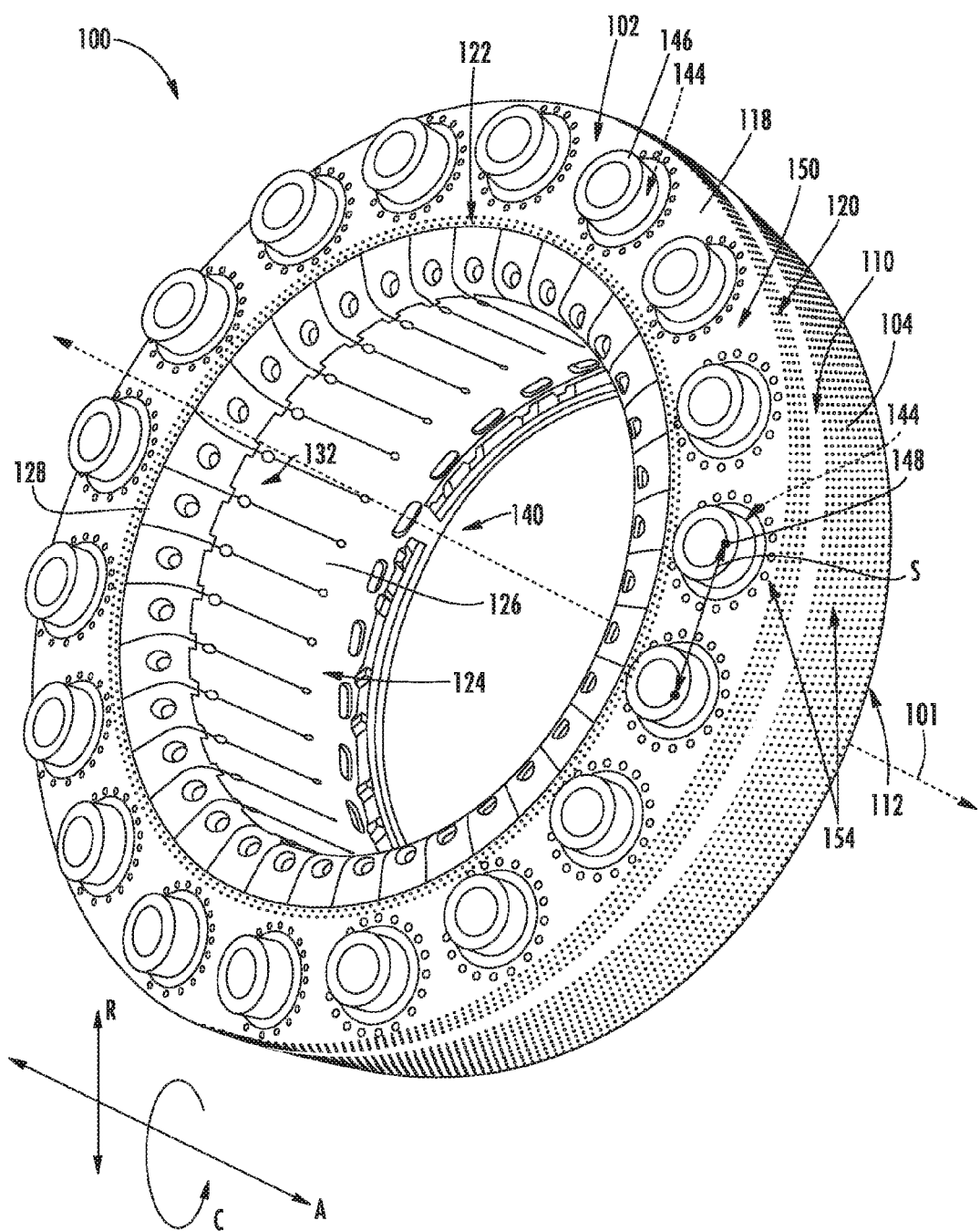
FIG. 2 is a perspective view of a combustor assembly in accordance with an exemplary embodiment of the present disclosure.
Figure 3:
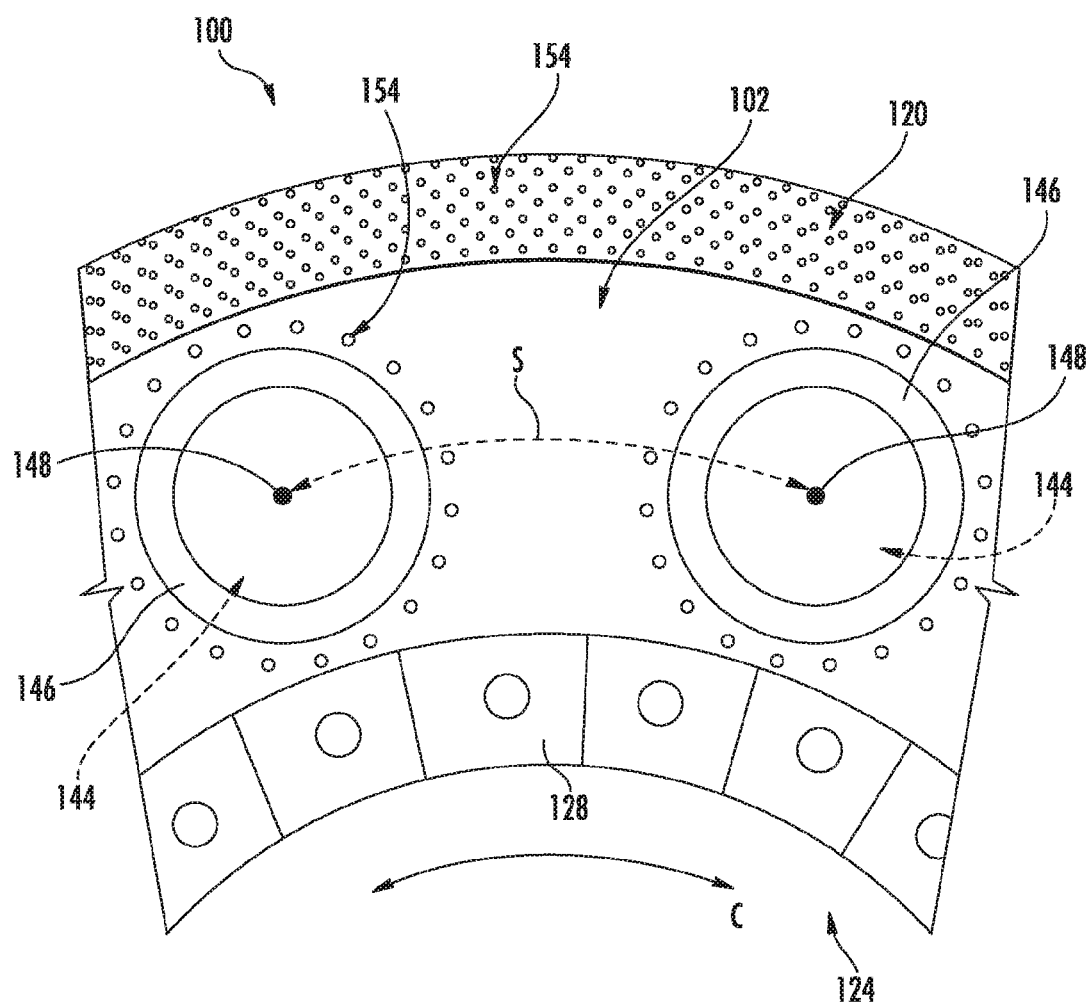
FIG. 3 is a close-up view of a forward end of the exemplary combustor assembly of FIG. 2.
Figure 4:
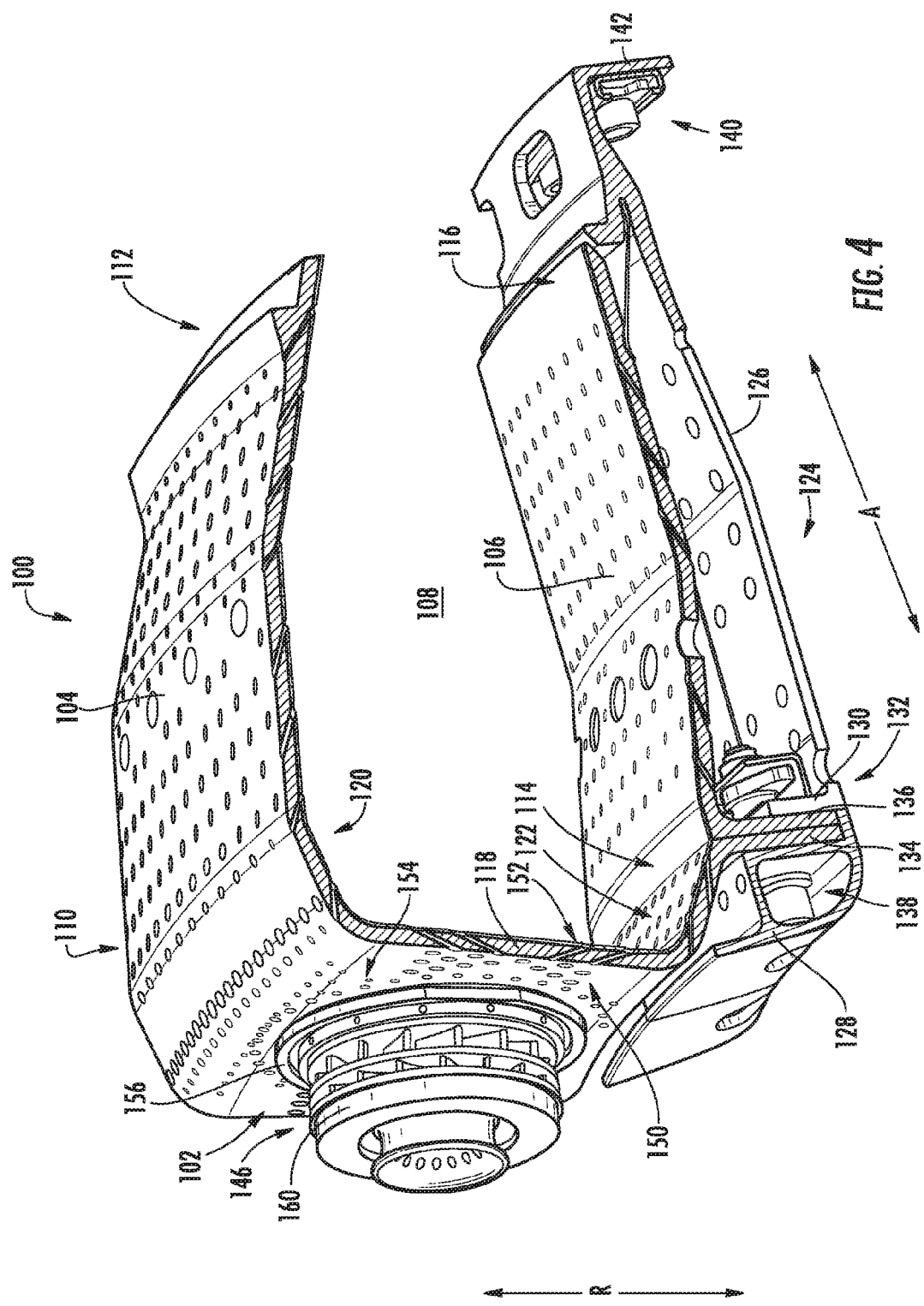
FIG. 4 is a perspective view of a section of the exemplary combustor assembly of FIG. 2.

Referring now to FIGS. 2 through 4, views are provided of a combustor assembly 100 for a gas turbine engine in accordance with an exemplary embodiment of the present disclosure. For example, the combustor assembly 100 of FIGS. 2 through 4 may be positioned in the combustion section 26 of the exemplary turbofan engine 10 of FIG. 1, which defines an axial direction A, a radial direction R, and a circumferential direction C. More particularly, FIG. 2 provides a perspective view of the combustor assembly 100; FIG. 3 provides a close-up view of a forward end of the combustor assembly 100 of FIG. 2; and FIG. 4 provides a perspective, cross-sectional view of a section of the exemplary combustor assembly 100 of FIG. 2.

As shown, the combustor assembly 100 defines a centerline 101 and generally includes a combustor dome 102 and a combustion chamber liner. When assembled in a gas turbine engine, the centerline 101 of the combustor assembly 100 aligns with a centerline of the gas turbine engine (see, centerline 12 of FIG. 1). For the embodiment depicted, the combustion chamber liner is configured as a combustion chamber outer liner 104, and the combustor dome 102 and combustion chamber outer liner 104 are formed integrally. Additionally, the combustor assembly 100 includes a combustion chamber inner liner 106 (see FIG. 4). The combustor dome 102, combustion chamber outer liner 104, and combustion chamber inner liner 106 each extend along the circumferential direction C. More particularly, the combustor dome 102, combustion chamber outer liner 104, and combustion chamber inner liner 106 each extend continuously along the circumferential direction C to define an annular shape, without any seams or joints where multiple pieces would otherwise be combined. The combustor dome 102, combustion chamber outer liner 104, and combustion chamber inner liner 106 at least partially define a combustion chamber 108. The combustion chamber 108 also extends along the circumferential direction to define an annular shape. Accordingly, the combustor assembly 100 may be referred to as an annular combustor.

Referring still to FIGS. 2 through 4, for the embodiment depicted the combustor dome 102, combustion chamber inner liner 106, and combustion chamber outer liner 104 are each formed of a ceramic matrix composite ("CMC") material. CMC material is a non-metallic material having high temperature capability. Exemplary CMC materials utilized for the combustor dome 102 and combustion chamber liners (e.g., the outer liner 104 and inner liner 106) may include silicon carbide, silicon, silica or alumina matrix materials and combinations thereof. Ceramic fibers may be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAMIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y and combinations thereof) and inorganic fillers (e.g., pyrophyllite, wollastonite, mica, talc, kyanite and montmorillonite).

It should be appreciated, however, that in other embodiments, the combustion chamber outer liner 104 and combustor dome 102 may not be formed integrally, and instead may be joined in any other suitable manner. Additionally, in other embodiments, the combustor dome 102, combustion chamber inner liner 106, and combustion chamber outer liner 104 may not extend continuously along the circumferential direction C and instead may be formed of a plurality of individual components. Further, in still other embodiments, one or more of the combustor dome 102, combustion chamber inner liner 106, and combustion chamber outer liner 104 may be formed of any other suitable material, such as a metal material, and may include one or more coatings, such as an environmental barrier coating.

Referring to FIG. 4 in particular, the combustion chamber outer liner 104 and combustion chamber inner liner 106 each extend generally along the axial direction A—the combustion chamber outer liner 104 extending between a forward end 110 and an aft end 112 and the combustion chamber inner liner 106 similarly extending between a forward end 114 and an aft end 116. Additionally, the combustor dome 102 includes a forward wall 118 and a transition portion. Specifically, the combustor dome 102 depicted includes an outer transition portion 120 and an inner transition portion 122. The outer transition portion 120 is positioned along an outer edge of the forward wall 118 along the radial direction R and the inner transition portion 122 is positioned along an inner edge of the forward wall 118 along the radial direction R. The inner and outer transition portions 122, 120 each extend circumferentially with the forward wall 118 of the combustor dome 102 (see a FIG. 2).

Further, the outer transition portion 120 extends from the forward wall 118 towards the outer liner 104 and the inner transition portion 122 extends from the forward wall 118 towards the inner liner 106. As stated, for the embodiment depicted the outer liner 104 is formed integrally with the combustor dome 102 (including the forward wall 118 and the outer transition portion 120), and thus the outer transition portion 120 extends seamlessly from the forward wall 118 to the outer liner 104. For example, the combustor dome 102 and combustion chamber outer liner 104 together define a continuous and seamless surface extending from the combustor dome 102 to the combustion chamber outer liner 104.

By contrast, the combustion chamber inner liner 106 is formed separately from the combustor dome 102 and combustion chamber outer liner 104. The combustion chamber inner liner 106 is attached to the combustor dome 102 using a mounting assembly 124. The mounting assembly 124 for the embodiment depicted generally includes a support member 126 extending substantially continuously along the circumferential direction C and a plurality of brackets 128. The support member 126 includes a flange 130 at a forward end 132. The flange 130 of the support member 126 and a plurality of brackets 128 are disposed on opposite sides of a coupling flange 134 of the combustor dome 102 and a coupling flange 136 of the inner combustion chamber inner liner 106. An attachment member 138, or more particularly, a bolt and nut press the flange 132 of the support member 126 and the plurality of brackets 128 together to attach the combustor dome 102 and combustion chamber inner liner 106. Additionally, the support member 126 extends to an aft end 140, the aft end 140 including a mounting flange 142 for attachment to a structural component of the gas turbine engine, such as a casing or other structural member. Accordingly, the combustion chamber outer liner 104, combustor dome 102, and combustion chamber inner liner 106 may each be supported within the gas turbine engine at a forward end of the combustor assembly 100 (i.e., at the forward end 114 of the inner liner 106) through the support member 126 of the mounting assembly 124.

As will be described in greater detail below with reference to FIGS. 5 through 7, the combustor dome 102 additionally defines an opening 144 and the combustor assembly 100 includes a fuel-air injector hardware assembly 146. More particularly, the combustor dome 102 defines a plurality of openings 144 and the combustor assembly 100 includes a respective plurality of fuel-air injector hardware assemblies 146—each opening 144 configured to receive a respective one of the plurality of fuel-air injector hardware assemblies 146. For the embodiment depicted, each of the openings 144 are substantially evenly spaced along the circumferential direction C. Referring specifically to FIG. 3, each of the openings 144 defined by the combustor dome 102 includes a center 148, and the combustor dome 102 defines a spacing S measured along the circumferential direction C from the center 148 of one opening 144 to a center 148 of an adjacent opening 144. Accordingly, as depicted, the spacing S may be defined as an arc length between the center 148 of one opening 144 and the center 148 of an adjacent opening 144. Further, although the fuel-air injector hardware assemblies 146 are depicted schematically in FIGS. 2 and 3, a centerline 149 (see FIG. 5) of the fuel-air injector hardware assemblies 146 may pass through the center 148 of the opening 144 through which it extends. Accordingly, in certain exemplary embodiments, the spacing S may also be defined as a distance along the circumferential direction C between the centerlines 149 of adjacent fuel-air injector hardware assemblies 146 (and more specifically between portions of the centerlines 149 passing through the respective openings 144). The spacing S may be consistent for each of the plurality of openings 144.

Generally, the fuel-air injector hardware assemblies 146 are configured to receive a flow of combustible fuel from a fuel nozzle (not shown) and compressed air from a compressor section of a gas turbine engine in which the combustor assembly 100 is installed (see FIG. 1). The fuel-air injector hardware assemblies 146 mix the fuel and compressed air and provide such fuel-air mixture to the combustion chamber 108. As will also be discussed in greater detail below, each of the fuel air injector hardware assemblies 146 include components for attaching the assembly directly to the combustor dome 102. Notably, for the embodiment depicted, such components of each of the plurality of fuel-air injector hardware assemblies 146 are configured such that one or more of the assemblies are attached to the combustor dome 102 independently of an adjacent fuel-air injector hardware assembly 146. More particularly, for the embodiment depicted, each fuel-air injector hardware assembly 146 is attached to the combustor dome 102 independently of each of the other fuel-air injector hardware assemblies 146. Accordingly, no part of the fuel-air injector hardware assemblies 146 are attached to the adjacent fuel-air injector hardware assemblies 146, except through the combustor dome 102. Such a configuration is enabled at least in part by the configuration of the exemplary combustor dome 102 extending substantially continuously along the circumferential direction C.

As may also be seen in FIGS. 2 through 4, the combustor dome 102 generally includes a first side, or a cold side 150, and a second side, or a hot side 152, the hot side 152 being exposed to the combustion chamber 108. The combustor dome 102 defines a plurality of cooling holes 154 extending from the cold side 150 to the hot side 152 to allow for a flow of cooling air therethrough. As may be seen, the plurality of cooling holes 154 includes a plurality of cooling holes 154 extending around each of the openings 144 defined by the combustor dome 102, or rather spaced around a circumference of each of the openings 144 defined by the combustor dome 102. Such cooling holes 154 may be configured to provide a flow of cooling air to certain components of the fuel-air injector hardware assemblies 146 located within the combustion chamber 108.

Figure 5:
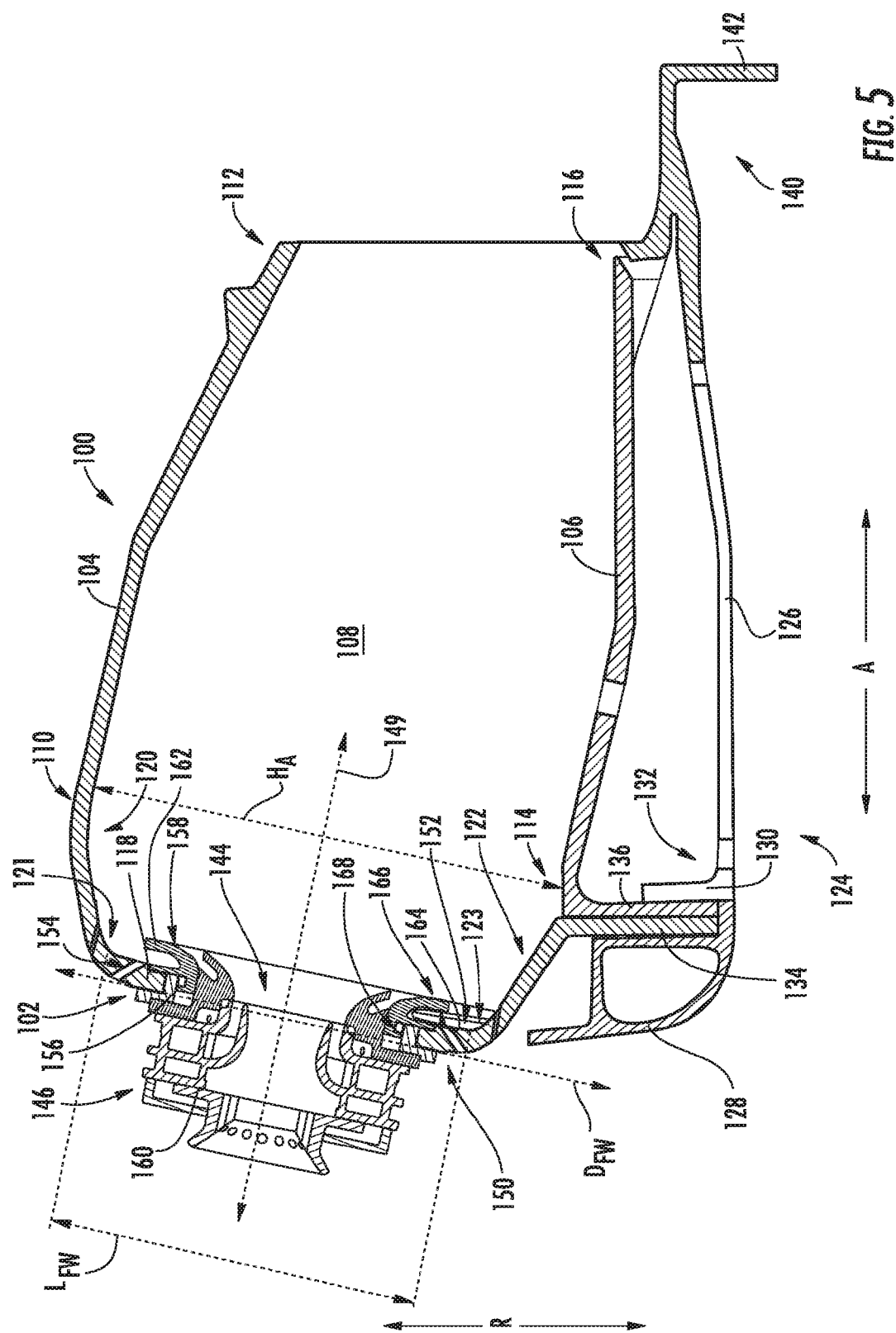
FIG. 5 is a side, cross-sectional view of the exemplary combustor assembly of FIG. 2.
Figure 6:
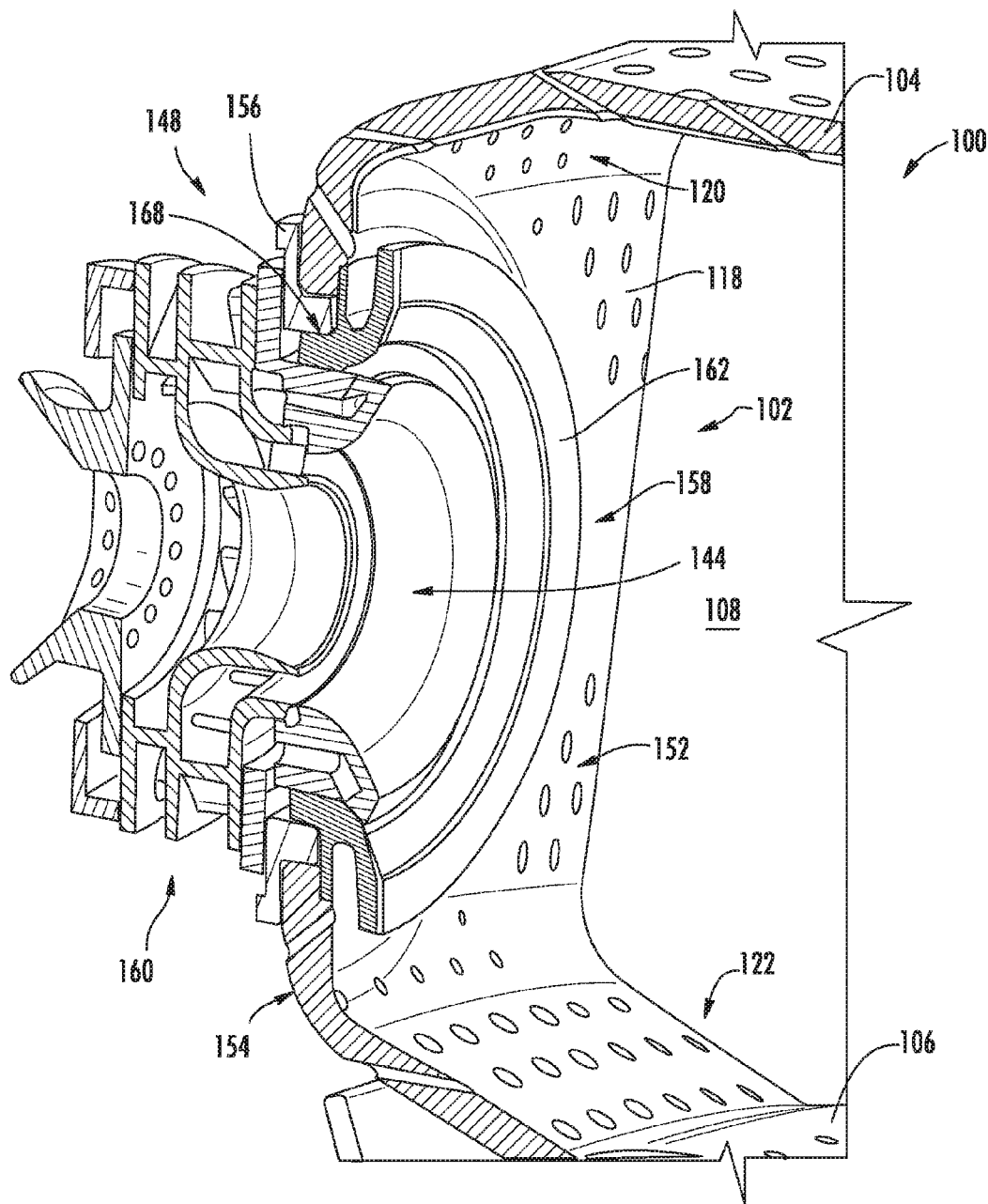
FIG. 6 is a close-up, perspective, cross-sectional view of a fuel-air injector hardware assembly in accordance with an exemplary embodiment of the present disclosure attached to a combustor dome in accordance with an exemplary embodiment of the present disclosure.
Figure 7:
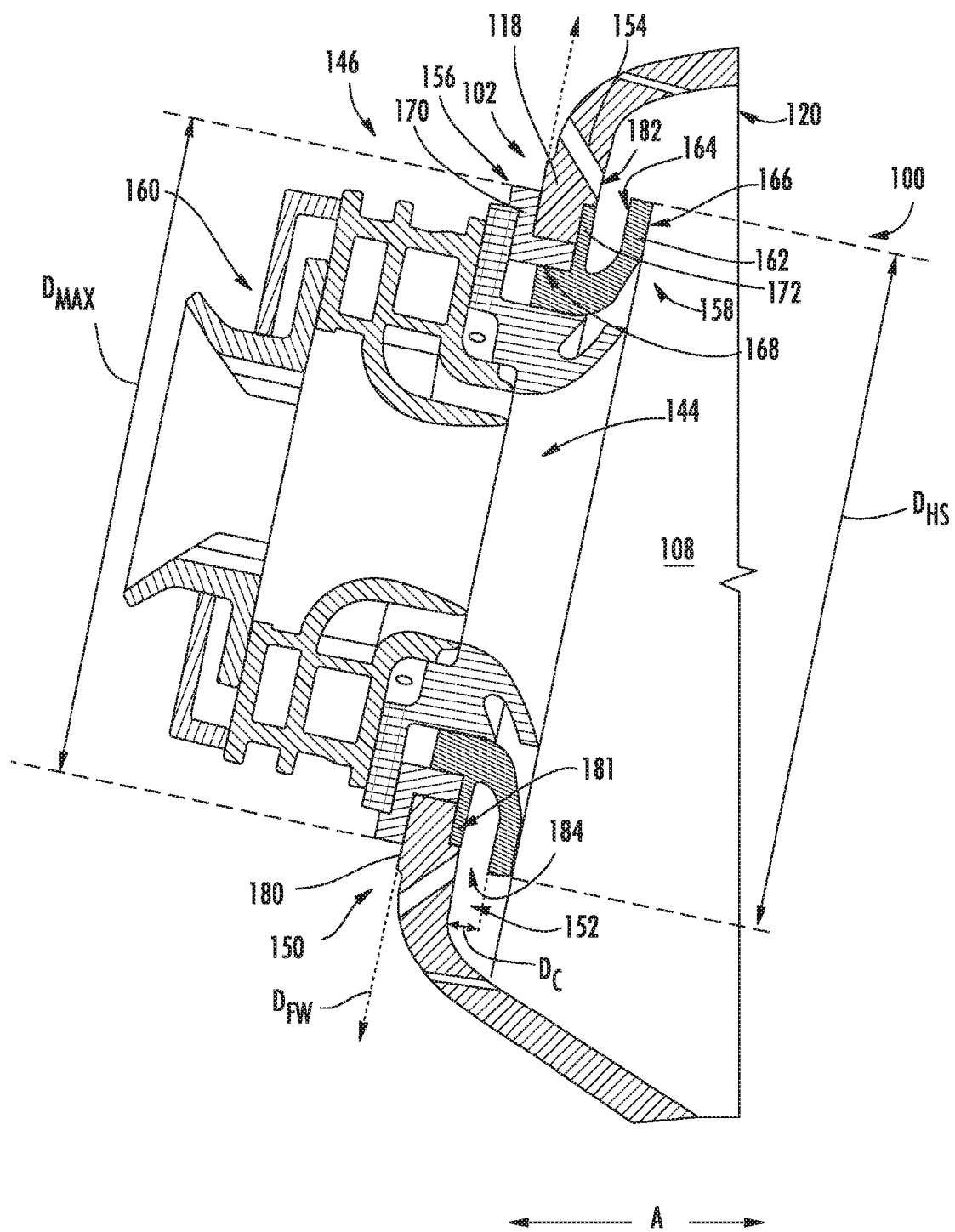
FIG. 7 is a close-up, side, cross-sectional view of the exemplary fuel-air injector hardware assembly attached to the exemplary combustor dome of the exemplary combustor assembly of FIG. 2.

Referring now to FIGS. 5 through 7, additional views of the exemplary combustor assembly 100 of FIG. 2 are provided. Specifically, FIG. 5 provides a side, cross-sectional view of the exemplary combustor assembly 100 of FIG. 2; FIG. 6 provides a perspective, cross-sectional view of the fuel-air injector hardware assembly 146 attached the combustor dome 102; and FIG. 7 provides a side, cross-sectional view of the exemplary fuel-air injector hardware assembly 146 attached the combustor dome 102.

With reference specifically to FIG. 5, an exemplary fuel-air injector hardware assembly 146 extending at least partially through a respective one of the plurality of openings 144 defined by the combustor dome 102 is more clearly depicted. The exemplary fuel-air injector hardware assembly 146 defines a centerline 149 and generally includes a first member positioned at least partially adjacent to the cold side 150 of the combustor dome 102 and a second member positioned at least partially adjacent to the hot side 152 of the combustor dome 102. The first and second members together define an attachment interface 168 joining the first member to the second member and mounting the fuel-air injector hardware assembly 146 to the combustor dome 102. Moreover, the attachment interface 168 is shielded from (i.e., not directly exposed to) the combustion chamber 108 to protect the attachment interface 168 from relatively hot operating temperatures within the combustion chamber 108. For the embodiment depicted, the first member is a seal plate 156 and the second member is a heat shield 158. The fuel-air injector hardware assembly 146 further includes a swirler 160, the swirler 160 attached to the seal plate 156, e.g., by welding. The heat shield 158, seal plate 156, and swirler 160 may each be formed of a metal material, such as a metal alloy material.

The heat shield 158 defines an outer diameter $D_{HS}$, or more particularly, the heat shield 158 includes a heat deflector lip 162 positioned substantially within the combustion chamber 108 and defining the outer diameter $D_{HS}$. The heat deflector lip 162 is configured to protect or shield at least a portion of the fuel-air injector hardware assembly 146 from the relatively high temperatures within the combustion chamber 108 during operation. Notably, the heat deflector lip 162 generally includes a cold side 164 facing back towards the forward wall 118 of the combustor dome 102 and a hot side 166 facing downstream. The heat shield 158, or rather the heat deflector lip 162, may include an environmental barrier coating, or other suitable protective coating, on the hot side 166 (not shown).

For the embodiment depicted, the heat shield 158 is a relatively small heat shield 158 as compared to an overall size of the combustor assembly 100, and more particularly, as compared to a size of the combustion chamber 108 and the forward wall 118 of the combustor dome 102 of the combustor assembly 100. For example, the combustion chamber 108 includes an annulus height $H_A$ defined between the inner liner 106 and the outer liner 104. Specifically, the forward wall 118 of the combustor dome 102 defines a direction $D_{FW}$ intersecting with a centerline 101 of the combustor assembly 100, and for the embodiment depicted, the annulus height $H_A$ is defined in a direction parallel to the direction $D_{FW}$ of the forward wall 118 of the combustor dome 102. Additionally, the direction $D_{FW}$ of the forward wall 118 is orthogonal to the centerline 149 of the fuel-air injector hardware assembly 146. A ratio of the annulus height $H_A$ of the combustion chamber 108 to the outer diameter $D_{HS}$ of the heat shield 158 ("$H_A:D_{HS}$") is at least about 1.3:1. For example, the ratio $H_A:D_{HS}$ of the annulus height $H_A$ of the combustion chamber 108 to the outer diameter $D_{HS}$ of the heat shield 158 may be at least about 1.4:1, at least about 1.5:1, at least about 1.6:1, or up to about 1.8:1. As used herein, terms of approximation, such as "about" or "approximate," refer to being within a 10% margin of error.

Moreover, the exemplary forward wall 118 of the combustor dome 102 defines a length $L_{FW}$ along the direction $D_{FW}$ of the forward wall 118. For the embodiment depicted, the length $L_{FW}$ of the forward wall 118 is defined from a first bend 121 between the transition portion 120 and the forward wall 118 and a first bend 123 between the transition portion 122 and the forward wall 118. A ratio of the length $L_{FW}$ of the forward wall 118 to the outer diameter $D_{HS}$ of the heat shield 158 ("$L_{FW}$:$D_{HS}$") is at least about 1.1:1. For example, the ratio $L_{FW}$:$D_{HS}$ of the length $L_{FW}$ of the forward wall 118 to the outer diameter $D_{HS}$ of the heat shield 158 may be at least about 1.15:1, at least about 1.2:1, or between 1.1:1 and 1.5:1.

Further, as described above with respect to FIG. 2, the combustor assembly 100 defines a spacing S from a center 148 of one opening 144 to a center 148 of an adjacent opening 144 measured along the circumferential direction C (see FIG. 2). For the embodiment depicted, a ratio of the spacing S to the outer diameter $D_{HS}$ of the heat shield 158 ("S:$D_{HS}$") is at least about 1.3:1. For example, the ratio S:$D_{HS}$ of the spacing S of the plurality of openings 144 to the outer diameter $D_{HS}$ of the heat shield 158 may be at least about 1.4:1, at least about 1.5:1, at least about 1.7:1, or up to about 1.9:1.

Accordingly, with such a configuration, the combustor dome 102 may be relatively exposed to the operating temperatures within the combustion chamber 108 during operation of the combustor assembly 100. However, the reduced footprint of the heat shield 158 may result in a lighter overall combustor assembly 100. Additionally, the inventors of the present disclosure have discovered that given that the combustor dome 102 may be formed of a CMC material, the combustor dome 102 may be well-suited for withstanding such elevated temperatures.

Despite having a reduced footprint, the heat shield 158 may still protect the various other metal components of the fuel-air injector hardware assembly 146. For example, referring still to FIG. 5, the seal plate 156 and swirler 160 of the fuel-air injector hardware assembly 146 define a maximum outer diameter $D_{MAX}$ (see also FIG. 7, below). The maximum outer diameter $D_{MAX}$ of the seal plate 156 and swirler 160 is less than or equal to the outer diameter $D_{HS}$ of the heat shield 158. For example, in certain exemplary embodiments, a ratio of the outer diameter $D_{HS}$ of the heat shield 158 to the maximum outer diameter $D_{MAX}$ of the swirler 160 and seal plate 156 ("$D_{HS}$:$D_{MAX}$") may be between about 1:1 and about 1.1:1.

Referring now particularly to FIGS. 6 and 7, as previously discussed, the fuel-air injector hardware assembly 146 includes a first member, or seal plate 156, and a second member, or heat shield 158. The fuel-air injector hardware assembly 146 additionally includes the swirler 160, which as used herein refers generally to the various components provided for receiving and mixing flows of fuel and air, as well for providing such mixture to the combustion chamber 108.

The seal plate 156 is positioned at least partially adjacent to the cold side 150 of the combustor dome 102 and the heat shield 158 is positioned at least partially adjacent to the hot side 152 of the combustor dome 102. The seal plate 156 and heat shield 158 are joined to one another to mount the fuel-air injector hardware assembly 146 to the combustor dome 102. Specifically, as stated above, the seal plate 156 and heat shield 158 together define the attachment interface 168. In certain exemplary embodiments, the seal plate 156 may be rotatably engaged with the heat shield 158, and thus the attachment interface 168 may be a rotatable attachment interface formed of complementary threaded surfaces of the seal plate 156 and the heat shield 158.

Particularly for the embodiment depicted, the seal plate 156 defines a first flange 170 positioned adjacent to the cold side 150 of the combustor dome 102 and the heat shield 158 includes a second flange 172 positioned adjacent to the hot side 152 of the combustor dome 102. During assembly, the heat shield 158 and seal plate 156 may be tightened at the attachment interface 168 to a desired clamping force (i.e., to a specific torque when the attachment interface 168 is a rotatable attachment interface 168) for the given combustor assembly 100. Accordingly, the first and second flanges 170, 172 are pressed towards each other (against the combustor dome 102) when assembled such that they are attached to the combustor dome 102. The swirler 160 and/or other components of the fuel-air injector hardware assembly 146 may then be attached to, e.g., the seal plate 156 by welding or in any other suitable manner. Additionally, once assembled, the seal plate 156 may be welded to the heat shield 158 at the attachment interface 168 to prevent loosening of the seal plate 156 relative to the heat deflector (i.e., to prevent rotation of the seal plate 156 relative to the heat shield 158). It should be appreciated, however, that the swirler 160 and/or other components of the fuel-air injector hardware assembly 146 may be attached to, e.g., the seal plate 156 in any other suitable manner, such as by using a mechanical fastener or other mechanical fastening means.

Figure 8:
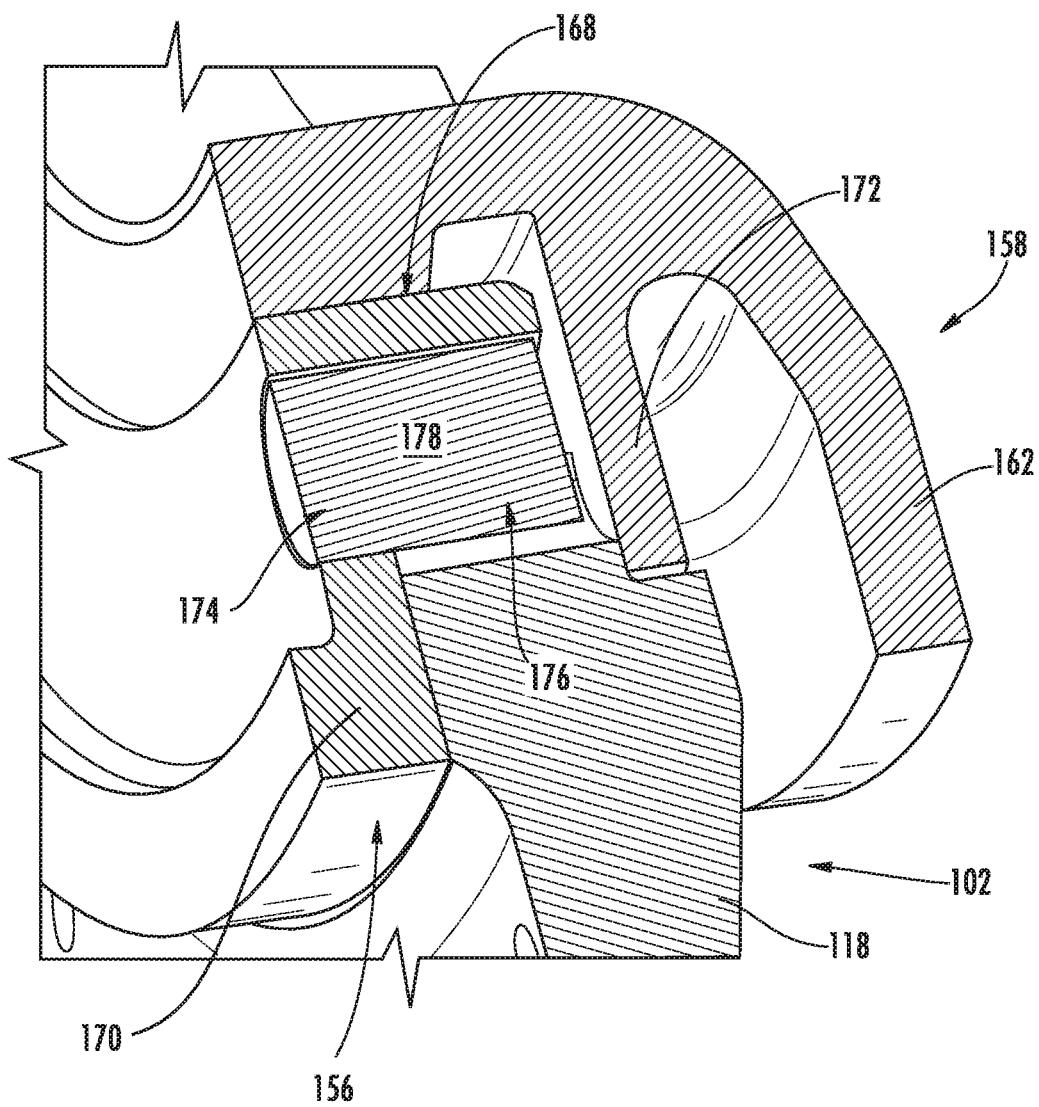
FIG. 8 is a close-up, perspective, cross-sectional view of a portion of the exemplary fuel-air injector hardware assembly attached the exemplary combustor dome of the exemplary combustor assembly of FIG. 2.

Further, referring briefly to FIG. 8, providing a close-up, perspective, cross-sectional view of a portion of the seal plate 156 and combustor dome 102. The seal plate 156 defines a slot 174 and the combustor dome 102 additionally defines a slot 176. The fuel-air injector hardware assembly 146 includes a pin 178 extending through the slot 174 in the seal plate 156 and into the slot 176 in the combustor dome 102. The pin 178 may be a cylindrical, metal pin, or alternatively, may have any other suitable shape and may be configured of any other suitable material. Regardless, the pin 178 may prevent rotation of the seal plate 156 relative to the combustor dome 102. The pin 178 may be welded or otherwise affixed to the seal plate 156, e.g., prior to installation of the of the seal plate 156, or once the seal plate 156 and pin 178 are in position.

Referring still to the embodiment of FIGS. 6 and 7, the first flange 170 is positioned directly against the cold side 150 of the combustor dome 102 and the second flange 172 is positioned directly against the hot side 152 of the combustor dome 102. Accordingly, no intermediary components are required between e.g., the seal plate 156 and combustor dome 102 or heat shield 158 and combustor dome 102 for mounting the fuel-air injector hardware assembly 146. Notably, the combustor dome 102 includes a raised boss 180 (FIG. 7) extending around a circumference of the opening 144 in the combustor dome 102 on the cold side 150 to provide a desired thickness and additional strength for an attachment portion of the combustor dome 102 around the opening 144 defined in the combustor dome 102. Additionally, the combustor dome 102 includes a recess 181 extending around a circumference of the opening 144 in the combustor dome 102 on the hot side 152 to receive the flange 172 of the heat shield 158. It should be appreciated, however, that in certain embodiments, the combustor assembly 100 may include an intermediate component between the first and second flanges 170, 172 and the combustor dome 102.

Also for the embodiment depicted, the combustor dome 102 is formed of a CMC material, while the fuel-air injector hardware assembly 146 is formed of a metal material, such as metal alloy material. In order to prevent thermal expansion relative to the combustor dome 102 beyond a desired amount (i.e., thermal expansion of the portions of the seal plate 156 and heat shield 158 attaching the fuel-air injector hardware assembly 146 to the combustor dome 102), the attachment interface 168 defined by the seal plate 156 and heat shield 158 is positioned at least partially in the opening 144 of the combustor dome 102. With such a configuration, the attachment interface 168 may be protected by the heat shield 158 and/or other components of the fuel-air injector hardware assembly 146. For example, the heat shield 158 may be configured to protect or shield the attachment interface 168 from an amount of heat in the combustion chamber 108 during operation of the combustor assembly 100. Accordingly, the components attaching the fuel-air injector hardware assembly 146 to the combustor dome 102 may be prevented from thermal expansion beyond a desired amount during operation of the combustor assembly 100, such that the attachment of the fuel-air injector hardware assembly 146 to the combustor dome 102 remains intact during operation of the combustor assembly 100.

Furthermore, in order to maintain the heat shield 158 within a desired operating temperature range during operation of the combustor assembly 100, in addition to protecting the attachment interface 168, the combustor dome 102 is configured to provide a cooling airflow to the heat shield 158 during operation of the combustor assembly 100. As stated, the combustor dome 102 includes a cooling hole 154 extending through the combustor dome 102. Specifically, for the embodiment depicted, the cooling hole 154 is oriented to direct a cooling airflow onto the heat deflector lip 162 of the heat shield 158, or rather onto the cold side 164 of the heat deflector lip 162 of the heat shield 158. For example, the exemplary cooling hole 154 depicted slants towards the opening 144 in the combustor dome 102 from the cold side 150 of the combustor dome 102 to the hot side 152 of the combustor dome 102 (i.e., slants towards the opening 144 as it extends from the cold side 150 of the combustor dome 102 to the hot side 152 of the combustor dome 102). Further, the cooling hole 154 includes an outlet 182 at the hot side 152 of the combustor dome 102, and for the embodiment depicted, the heat deflector lip 162 of the heat shield 158 covers the outlet 182 of the cooling hole 154 in the combustor dome 102. For example, at least a portion of the heat deflector lip 162 extends farther out than at least a portion of the outlet 182 of the cooling hole 154 relative to the center 148 of the opening 144. For example, in the cross-section depicted in FIG. 5, the heat deflector lip 163 extends farther out than at least a portion of the outlets 182 of the cooling holes 154 depicted relative to the center 148 of the opening 144 in a direction parallel to the direction $D_{FW}$ of the forward wall 118 of the combustor dome 102. With such a configuration, at least a majority of airflow through the cooling hole 154 must flow onto the cold side 164 of the heat deflector lip 162.

Particularly for the embodiment depicted, the cold side 164 of the heat deflector lip 162 of the heat shield 158 at least partially defines a channel 184. Specifically, the channel 184 is defined by the cold side 164 of the heat deflector lip 162 along with the second flange 172 of the heat shield 158 and a portion of the hot side 152 of the combustor dome 102. For the embodiment depicted, the heat deflector lip 162 extends in a circular direction that is similar in shape to the circumference of the opening 144 in the combustor dome 102. Accordingly, the channel 184 may be referred to as a circumferential channel.

During operation of the combustor assembly 100 a cooling airflow is provided through the cooling hole 154 in the combustor dome 102 and, due to the orientation of the cooling hole 154, the cooling airflow is provided into the channel 184 such that the channel 184 receives the cooling airflow. In certain embodiments, the cooling airflow may originate from a compressor section of the gas turbine engine into which the combustor assembly 100 is installed (see FIG. 1). The cooling airflow may remove an amount of heat from the heat deflector lip 162 to maintain the heat shield 158 within a desired operating temperature range. Additionally, the cooling airflow may maintain the components attaching the fuel-air injector hardware assembly 146 to the combustor dome 102 within a desired operating temperature range. As is depicted, the exemplary channel 184 depicted defines a U-shape. The channel 184 may thus redirect the cooling airflow from the cooling hole 154 along the hot side 152 of the combustor dome 102 and downstream to begin a cooling flow for the combustor dome 102 as well. However, in other embodiments, the channel 184 may have any other suitable shape for providing such functionality, if desired.

In order to ensure the above functionalities are achieved by the channel 184, the channel 184 may define at least a minimum height $D_C$. In particular, the channel 184 may define the height $D_C$ in a direction perpendicular to the direction $D_{FW}$ of the forward wall 118 of the combustor dome 102 (see FIG. 5). The height $D_C$ of the channel 184 is dependent on an anticipated amount of cooling air through the channel 184 to maintain a velocity of the cooling air in the channel 184 above a threshold value. For example, in certain embodiments the height $D_C$ of the channel 184 may be at least about 0.010 inches, such as at least about 0.025 inches, such as at least about 0.050 inches, or any other suitable height.

Notably, as previously stated the combustor dome 102 may further include a plurality of cooling holes 154 spaced along a circumference of the opening 144 in the combustor dome 102. Specifically, the combustor dome 102 may further include a plurality of cooling holes 154 oriented to direct a cooling airflow onto the cold side 164 of the heat deflector lip 162. Such a configuration may further ensure the heat shield 158 is maintained within a desired operating temperature range during operation of the combustor assembly 100, and/or that the components attaching the fuel-air injector hardware assembly 146 to the combustor dome 102 remain within a desired operating temperature range.

A combustor assembly in accordance with one or more embodiments of the present disclosure may provide for an efficient means for attaching a fuel-air injector hardware assembly, formed generally of a metal material, to a combustor dome, which may be formed generally of a CMC material. Additionally, with such a configuration the heat shield may be sized to provide a desired amount of protection from the relatively high temperatures within the combustion chamber during operation of the combustor assembly, without being excessively large and/or without adding an undue amount of weight to the combustor assembly. Further, a fuel-air injector hardware assembly including one or more features of the present disclosure may allow for heat shield to provide a desired amount of protection from the relatively high temperatures within the combustion chamber while being maintained within a desired operating temperature range and while maintaining the components attaching the fuel-air injector hardware assembly 146 to the combustor dome 102 within a desired operating temperature range. Further still, inclusion of a plurality of cooling holes through the combustor dome may allow for a more compact fuel-air injector hardware assembly, as a fuel-air injector hardware assembly would not be required to make room for cooling airflow therethrough. Additionally, providing cooling airflow through the combustor dome may allow for better source pressure (as opposed to flowing the cooling air through the fuel-air injector hardware assembly).

It should be appreciated, however, that the combustor assembly 100, and particularly the combustor dome 102 and the fuel-air injector hardware assembly 146, are provided by way of example only, and that other embodiments may have any other suitable configuration. For example, in other exemplary embodiments, the fuel-air injector hardware assembly 146 may be attached to the combustor dome 102 in any other suitable manner, the heat shield 158 of the fuel-air injector hardware assembly 146 may have any other suitable configuration, and similarly, the combustor dome 102 may have any other suitable configuration.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A combustor assembly for a gas turbine engine, the combustor assembly comprising:
    a combustor dome at least partially defining a combustion chamber and including a hot side and a cold side; and
    a fuel-air injector hardware assembly comprising
        a first member positioned at least partially adjacent to the cold side of the combustor dome; and
        a second member positioned at least partially adjacent to the hot side of the combustor dome, the first and second members together defining an attachment interface joining the first member to the second member and mounting the fuel-air injector hardware assembly to the combustor dome, the attachment interface shielded from the combustion chamber;
    wherein the first member defines a slot, wherein the combustor dome defines a slot, wherein the fuel-air injector assembly further comprises a pin extending through the slot in the first member and into the slot in the dome to prevent rotation of the first member relative to the combustor dome, and wherein the pin is disengaged from the second member.

2. The combustor assembly of claim 1, wherein the first member comprises a first flange positioned adjacent to the cold side of the combustor dome, wherein the second member comprises a second flange positioned adjacent to the hot side of the combustor dome, and wherein the first and second flanges are pressed towards each other by the attachment interface.

3. The combustor assembly of claim 2, wherein the first flange is positioned directly against the cold side of the combustor dome, and wherein the second flange is positioned directly against the hot side of the combustor dome.

4. The combustor assembly of claim 1, wherein the first member is rotatably engaged with the second member at the attachment interface.

5. The combustor assembly of claim 4, wherein the first member is additionally attached to the second member by welding or using a mechanical fastener.

6. The combustor assembly of claim 1, wherein the first member is a seal plate, and wherein the second member is a heat shield.

7. The combustor assembly of claim 6, wherein the fuel-air injector hardware assembly further comprises a swirler, and wherein the swirler is attached to the seal plate.

8. The combustor assembly of claim 1, wherein the combustor dome defines an opening, and wherein the fuel-air injector hardware assembly extends at least partially through the opening.

9. The combustor assembly of claim 8, wherein the opening of the combustor dome is a first opening of a plurality of openings defined by the combustor dome, wherein the fuel-air injector hardware assembly is a first fuel-air injector hardware assembly of a plurality of fuel-air injector hardware assemblies of the combustor dome, wherein each fuel-air injector hardware assembly is positioned at least partially within one of the plurality of openings of the combustor dome, and wherein one or more of the fuel-air injector hardware assemblies are attached to the combustor dome independently of an adjacent fuel-air injector hardware assembly.

10. The combustor assembly of claim 1, wherein the combustor dome is formed of a CMC material.

11. The combustor assembly of claim 1, wherein the combustor dome defines a plurality of cooling holes for providing a flow of cooling air to the second member and reducing a temperature of the attachment interface.

12. A combustor assembly for a gas turbine engine, the combustor assembly comprising:
    a combustor dome at least partially defining a combustion chamber and including a hot side and a cold side and defining an opening; and
    a fuel-air injector hardware assembly for providing a fuel-air mixture to the combustion chamber, the fuel-air injector hardware assembly comprising a first member positioned at least partially adjacent to the cold side of the combustor dome; and
    a heat shield for shielding at least a portion of the fuel-air injector hardware assembly and positioned at least partially adjacent to the hot side of the combustor dome, the heat shield joined to the first member to mount the fuel-air injector hardware assembly to the combustor dome,
    wherein the first member and heat shield together define an attachment interface positioned at least partially in the opening, wherein a portion of the heat shield defining the attachment interface is positioned inward of a portion of the first member defining the attachment interface relative to a center of the opening, and wherein the heat shield further comprises a flange positioned adjacent to the hot side of the combustor dome covering the portion of the first member defining the attachment interface relative to the combustion chamber;
    wherein the first member defines a slot, wherein the combustor dome defines a slot, wherein the fuel-air injector assembly further comprises a pin extending through the slot in the first member and into the slot in the dome to prevent rotation of the first member relative to the combustor dome, and wherein the pin is disengaged from the heat shield.

13. The combustor assembly of claim 12, wherein the first member is joined to the heat shield at the attachment interface, wherein the heat shield is configured to protect the attachment interface from an amount of heat in the combustion chamber during operation of the combustor assembly.

14. The combustor assembly of claim 12, wherein the first member is rotatably engaged with the heat shield at the attachment interface.

15. The combustor assembly of claim 12, wherein the first member is a seal plate, wherein the fuel-air injector hardware assembly further comprises a swirler, and wherein the swirler is attached directly to the seal plate.

16. The combustor assembly of claim 12, wherein the fuel-air injector hardware assembly extends at least partially through the opening.

17. The combustor assembly of claim 12, wherein the first member comprises a first flange positioned directly adjacent to the cold side of the combustor dome, wherein the wherein the flange of the heat shield is a second flange positioned directly adjacent to the hot side of the combustor dome, and wherein the first and second flanges are pressed towards each other to mount the fuel-air injector hardware assembly to the combustor dome.

18. The combustor assembly of claim 12, wherein the combustor dome includes a raised boss extending around a circumference of the opening on the cold side of the combustor dome, and wherein the combustor dome includes a recess extending around a circumference of the opening on the hot side of the combustor dome.

19. The combustor assembly of claim 1, wherein the combustor dome defines an opening, wherein the attachment interface is positioned at least partially in the opening, wherein a portion of the second member defining the attachment interface is positioned inward of a portion of the first member defining the attachment interface relative to a center of the opening, and wherein the second member further comprises a flange positioned adjacent to the hot side of the combustor dome covering the portion of the first member defining the attachment interface relative to the combustion chamber.

* * * * *